United States Patent [19]

Moskaitis et al.

[11] Patent Number: 5,002,596

[45] Date of Patent: Mar. 26, 1991

[54] FUEL VAPOR CANISTER

[75] Inventors: Richard J. Moskaitis, Fair Haven; Laura A. Ciuffetelli, Troy, both of Mich.

[73] Assignee: Chrysler Corporation, Highland Park, Mich.

[21] Appl. No.: 525,802

[22] Filed: May 21, 1990

[51] Int. Cl.[5] .............................................. B01D 53/02

[52] U.S. Cl. .......................................... 55/387; 55/88; 123/519

[58] Field of Search ..................... 55/74, 88, 316, 387; 123/519, 520

[56] References Cited

U.S. PATENT DOCUMENTS

| | | | |
|---|---|---|---|
| 3,464,186 | 9/1969 | Hankison et al. | 55/387 X |
| 3,477,210 | 11/1969 | Hervert | 55/387 |
| 3,628,314 | 12/1971 | McCarthy et al. | 55/387 |
| 3,831,353 | 8/1974 | Toth | 55/387 |
| 4,058,308 | 11/1977 | King | 55/387 |
| 4,604,110 | 8/1986 | Frazier | 55/74 |
| 4,683,862 | 8/1987 | Fornuto et al. | 123/520 |
| 4,684,382 | 8/1987 | Abu-Isa | 55/316 |
| 4,714,485 | 12/1987 | Covert et al. | 55/189 |
| 4,750,465 | 6/1988 | Rediker, Jr. et al. | 123/519 |
| 4,778,495 | 10/1988 | Bishop et al. | 55/269 |

*Primary Examiner*—Charles Hart

*Attorney, Agent, or Firm*—Kenneth H. MacLean

[57] ABSTRACT

For an automobile emissions fuel vapor storage system, an improved vapor storage canister of the type which utilizes particles of activated charcoal and which includes substantially evenly dispersed pieces of foam rubber among the particles of charcoal. The mixture of charcoal and foam rubber pieces are put into the interior of the canister so that the pieces of foam are compressed so that the charcoal pieces are held tightly together for long periods of time.

3 Claims, 1 Drawing Sheet

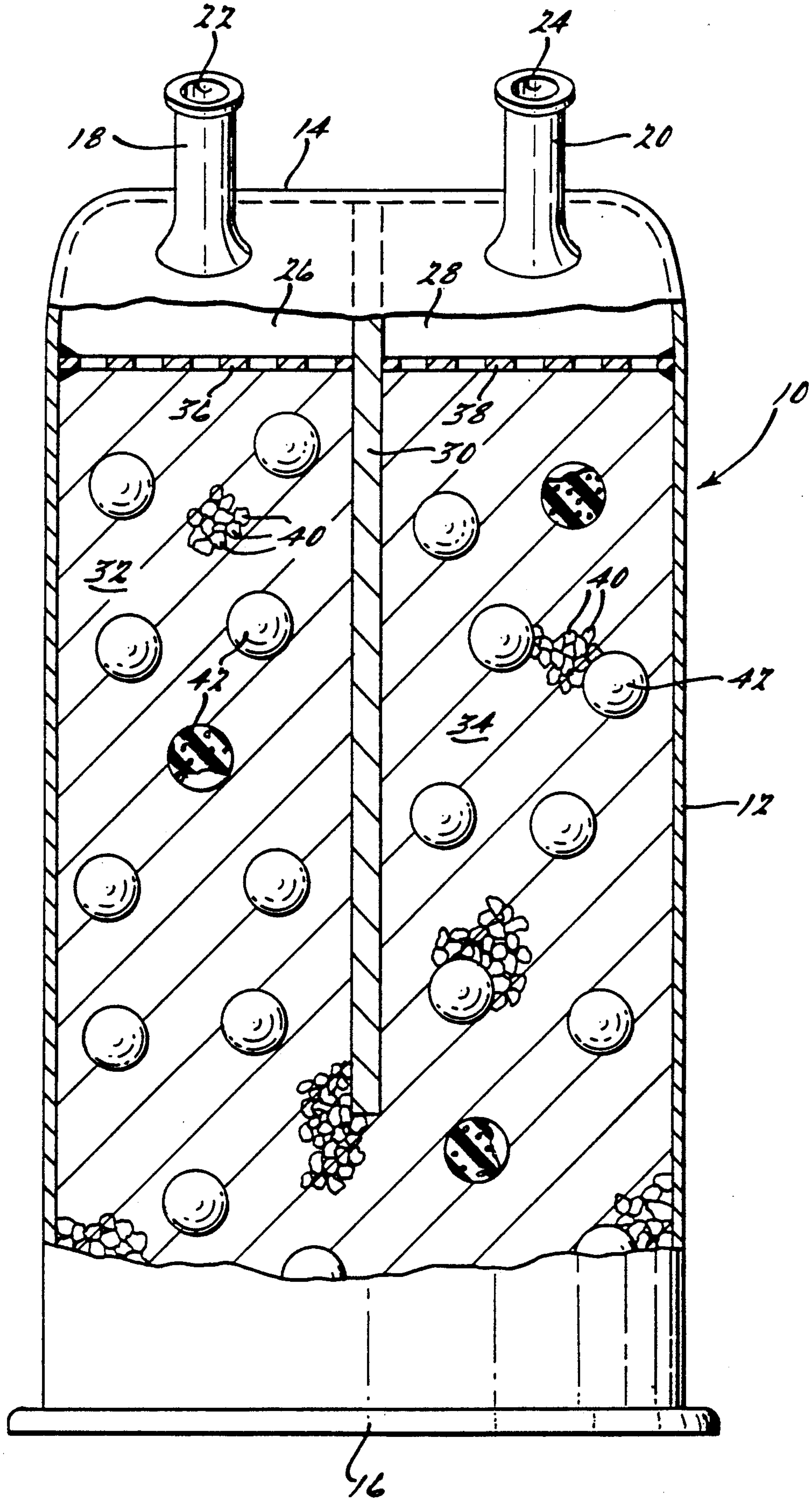
22
24
18
14
20
26
28
36
38
10
30
40
32
40
42
42
34
12
16

FUEL VAPOR CANISTER

BACKGROUND OF THE INVENTION

1. Field of Invention

This application describes an improved fuel vapor storage canister of the type utilizing activated charcoal and includes pieces of foam rubber dispersed with the particles of charcoal in a manner so that the mixture is packed into the canister sufficiently that the foam is compressed whereby the particles of charcoal are tightly held together over long periods of time.

2. Description of the Related Art

Automobile fuel emission control systems have used fuel vapor storage canisters of the activated charcoal type for some time. Fuel vapors are collected and stored in the canister during certain periods such as when the vehicle is inoperative or when the vehicle's catalyst converter is too cool to effectively operate. The vapors are selectively directed to the combustion chamber for burning during other periods by drawing air from the atmosphere through the canister during what may be referred to as a purging operation.

Storage canisters filled with particles of activated charcoal are particularly effective in storing fuel vapors. The particles of charcoal are initially sized to be easily introduced into the canister but the particles are large enough so that they will not pass through the perforate walls of screens used in the canister to retain the charcoal. Even when the particles are of desired initial size, over time, the pack of charcoal particles settles and becomes loose. In response to the expected vibrations caused by the vehicle, this looseness allows the particles to rub against one another. The rubbings tends to reduce the size of the particles while ultimately the particle size approaches the configuration of dust. Such reduction in size is undesirable as the charcoal cannot be effectively retained in the canister and air has more difficulty passing through the pack of reduced size particles.

There are many patents which show charcoal type vapor storage canisters with solutions to the above identified problem of loose packing and particle reduction. The U.S. Pat. Nos. 4,683,862; 4,684,382; 4,714,485; 4,750,465 and 4,778,495 disclose this type of canister in which the particles of charcoal are packed into the canister against a thin member of foam material which may also act as a filter. A problem with all of these patents is that the thin foam pad is located remotely from much of the particles of charcoal and the volume of the tin pad is not very great to insure long term tight packing of the charcoal particles.

The U.S. Pat. No. 4,604,110 to Frazier discloses filter and odor adsorbing medium for removing odors from the air of a home or the like. The filter may be plastic foam and the odor adsorbing medium is a mixture of silica gel, activated carbon (charcoal) and zeolite. As in the patents discussed in the previous paragraph, the foam filter material may help to maintain the granular material tightly packed. However, the same limitations apply to this patent.

SUMMARY OF THE INVENTION

The subject fuel vapor storage canister utilizes a great number of activated charcoal particles to adsorb fuel vapors. Many pieces of foam rubber are evenly dispersed with the charcoal particles. The mixture of charcoal particles and foam pieces are tightly packed into a canister so that the foam is compressed. Over time, the mass of charcoal is reduced in volume. Simultaneously, the foam rubber pieces extend toward there normal volume. Resultantly, the volume of the mixture remains constant and the charcoal particles do not move significantly with respect to one another enough to cause them to be reduced in size.

BRIEF DESCRIPTION OF THE DRAWING

The sole figure is a partially sectioned elevational view of a vapor storage canister with the subject mixture of activated charcoal particles and pieces of foam rubber.

DETAILED DESCRIPTION OF AN EMBODIMENT

In the drawings, a fuel vapor storage canister 10 used in association with engine emission system for automobiles is illustrated. The use of fuel vapor storage canisters is well known in the automobile emission art. The canister 10 is formed by a thin walled molded enclosure with a side wall 12, top wall 14 and bottom wall 16. The top wall 14 has spaced inlet and outlet fittings 18, 20 which communicate with the interior of the canister. Specifically, the fittings 18, 20 define passages 22, 24 which communicate with upper spaces 26, 28 of the canister interior. The interior of the canister and especially the upper spaces are separated by an internal partition 30 which extends from the top wall 14 downward toward but not reaching the bottom wall 16.

The upper spaces 26, 28 are separated from lower regions 32, 34 respectively by perforated walls or panels 36, 38. The perforated walls 36, 38 allow air to flow from the upper space 26 therethrough and into region 32. The flow then passes beneath the lower edge of the partition 30 and upward through the region 34. Then, the flow passes through the perforated wall 38 into the upper space 28.

The regions 32 and 34 which are interconnected below portion 30 are filled with a material to adsorb fuel vapors. The fuel vapors may enter the interior of the canister through the passage 24 or another inlet may be provided. Regions 32, 34 are normally filled with particles of activated charcoal 40 which has the desirable property of adsorbing fuel vapors. The aforedescribed flow of air from space 26 to space 28 is induced when it is desired to remove or purge the adsorbed fuel vapors from the charcoal.

As previously stated, there are always a concern with completely filling the canister's interior with charcoal particles. It important to completely fill the space or regions 32 and 34 so that the charcoal particles 40 do not unnecessarily grind against one another. If loosely packed the particles 40 vibrate and rub against one another. Over a period of time, the charcoal particles are reduced to a smaller size. Eventually, the charcoal may be reduced to dust and actually pass through the perforate end member. When the particles are tightly packed, they do not rub together excessively and the particle size is maintained for a significantly longer period of time.

As previously stated, it is known that an end wall or member of foamed plastic material can maintain tightness of the charcoal particles to some extent. Particularly in large volume and/or elongated canister designs, it is known that the use of a foam end piece is not effective to prevent problems particularly with respect to remote particles of charcoal. Applicants propose that a mixture of a plurality of foam rubber pieces 42 be dispersed with the particles of activated charcoal. The pieces and particles are introduced into the canister tightly to form a compressed pack. In the drawings, the pieces of foam rubber 42 are illustrated as perfect spheres. However, the spheres do not have to be perfectly spherical. In fact, the shape of the foam pieces 42 may take other shapes.

For the foam pieces 42 to effectively maintain the desired tight packing of the charcoal over time, the charcoal and foam mixture should be packed into the interior regions 32 and 34 under sufficient pressure so that the foam pieces 42 are compressed. Over time as the mixture packs even more tightly, the foam pieces expand toward a larger unpressured size.

The vapor storage canister embodiment which has been described and illustrated in the drawing is only for demonstrating the concept of the invention. The illustrated shape of the canister is not necessarily one which would be most efficient. In some contemplated examples the canister may be larger, smaller and/or more extended. Modifications of the canister with the mixture of tightly packed charcoal and foam particles are contemplated which do not fall outside of the scope of the invention as claimed hereafter.

What is claimed is:

1. An improved fuel vapor storage canister for use in a vehicle emission system of the type utilizing an enclosure with an interior communicated with a source of fuel vapor, the improved canister comprising: the enclosure having a mixture including a large plurality of particles of activated charcoal and many pieces of foam rubber, the pieces of foam rubber in the mixture being randomly and substantially evenly dispersed whereby substantially all the charcoal particles are spaced relatively closely to at least one foam rubber piece; the mixture being packed into the enclosure under pressure so that the pieces of foam rubber are compressed enough to tightly secure the charcoal particles one against another to prevent a grinding action therebetween.

2. The improved canister set forth in claim 1 in which the foam rubber particles are of closed cell material, thus unable to adsorb fuel vapors.

3. The improved canister set forth in claim 1 in which the foam rubber pieces are formed substantially as spheres.

* * * * *